United States Patent
Kioschis et al.

(10) Patent No.: US 10,651,452 B2
(45) Date of Patent: May 12, 2020

(54) CONNECTION ASSEMBLY FOR A TRACTION BATTERY IN PARTICULAR FOR ELECTRIC VEHICLES

(71) Applicant: TE Connectivity Germany GmbH, Bensheim (DE)

(72) Inventors: Kai Kioschis, Moerlheim (DE); Gerzson Toth, Mannheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 44 days.

(21) Appl. No.: 15/928,696

(22) Filed: Mar. 22, 2018

(65) Prior Publication Data

US 2018/0277819 A1     Sep. 27, 2018

(30) Foreign Application Priority Data

Mar. 23, 2017  (EP) .................... 17162583

(51) Int. Cl.
| | |
|---|---|
| *H01M 2/20* | (2006.01) |
| *H01R 4/28* | (2006.01) |
| *H01R 12/59* | (2011.01) |
| *H01M 10/48* | (2006.01) |
| *H01M 2/10* | (2006.01) |
| *H01M 10/42* | (2006.01) |

(52) U.S. Cl.
CPC .......... *H01M 2/206* (2013.01); *H01M 10/48* (2013.01); *H01R 4/28* (2013.01); *H01R 12/59* (2013.01); *H01M 2/1072* (2013.01); *H01M 2010/4271* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 10,516,144 | B2* | 12/2019 | Yuasa .................. | H01M 2/1016 |
| 2011/0076521 | A1* | 3/2011 | Shimizu ............. | H01M 2/1061 429/7 |
| 2012/0231638 | A1 | 9/2012 | Ikeda et al. | |
| 2014/0333238 | A1* | 11/2014 | Yokoyama ............ | E02F 9/0858 318/139 |
| 2014/0356691 | A1* | 12/2014 | Ahn ...................... | H01M 2/305 429/158 |
| 2015/0171405 | A1* | 6/2015 | Lee ......................... | H01M 2/24 429/89 |
| 2016/0190542 | A1* | 6/2016 | Sengoku ............. | H01M 2/1077 429/90 |
| 2017/0141371 | A1* | 5/2017 | Toshioka ............ | H01M 2/1016 |
| 2017/0244091 | A1* | 8/2017 | Yuasa .................. | H01M 2/202 |

(Continued)

FOREIGN PATENT DOCUMENTS

| | | |
|---|---|---|
| DE | 102012205019 A1 | 10/2013 |
| EP | 2546906 A1 | 1/2013 |

OTHER PUBLICATIONS

European Search Report, dated May 2, 2017, 8 pages.

*Primary Examiner* — Scott J. Chmielecki
(74) *Attorney, Agent, or Firm* — Barley Snyder

(57) ABSTRACT

A connection assembly for a traction battery comprises a busbar extending in an extension direction and a flexible electrical connection element extending along the busbar in the extension direction. The busbar has a compensation section in which the busbar extends perpendicular with respect to the extension direction.

15 Claims, 3 Drawing Sheets

(56) References Cited

U.S. PATENT DOCUMENTS

| | | | |
|---|---|---|---|
| 2018/0047958 A1* | 2/2018 | Sato | H01M 2/1077 |
| 2018/0076438 A1* | 3/2018 | DeKeuster | B29C 65/16 |
| 2018/0090735 A1* | 3/2018 | Huff | H01M 10/482 |
| 2019/0189994 A1* | 6/2019 | Narayanan | H01M 2/202 |

* cited by examiner

CONNECTION ASSEMBLY FOR A TRACTION BATTERY IN PARTICULAR FOR ELECTRIC VEHICLES

CROSS-REFERENCE TO RELATED APPLICATION

This application claims the benefit of the filing date under 35 U.S.C. § 119(a)-(d) of European Patent Application No. 17162583.3, filed on Mar. 23, 2017.

FIELD OF THE INVENTION

The present invention relates to a connection assembly and, more particularly, to a connection assembly for a traction battery of an electric vehicle.

BACKGROUND

A connection assembly for a traction battery of an electric vehicle commonly has at least one busbar and at least one flexible electrical connection element. The busbar and the flexible electrical connection element extend along each other in an extension direction. The busbar connects cells of the traction battery and the flexible electrical connection element can be used for monitoring voltages at certain positions of the connection assembly, for example, for monitoring voltages at certain cells to check the integrity of the cells.

The cells within a traction battery can move relative to one another due to mechanical forces during use or due to thermal expansion. This relative movement can lead to a loss of the electrical connection created by the busbar.

SUMMARY

A connection assembly for a traction battery comprises a busbar extending in an extension direction and a flexible electrical connection element extending along the busbar in the extension direction. The busbar has a compensation section in which the busbar extends perpendicular with respect to the extension direction.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
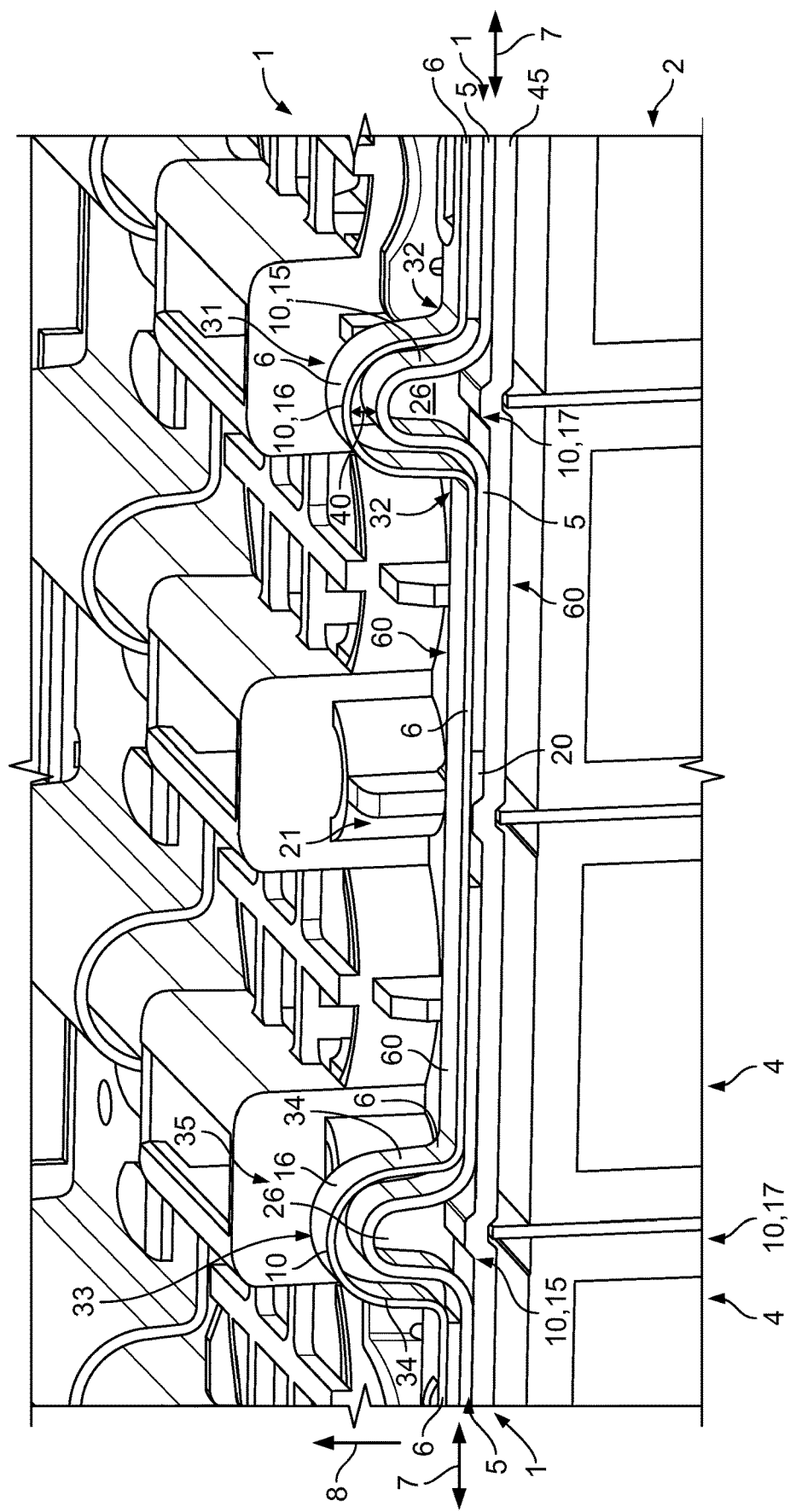
FIG. 1 is a perspective view of a connection assembly according to an embodiment.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A connection assembly 1 according to an embodiment is shown in FIG. 1. The connection assembly 1 has a plurality of busbars 5 and a flexible electrical connection element 6. The busbars 5 connect poles of cells 4 of a traction battery 2 which, in an embodiment, is part of an electric vehicle. The busbars 5 connect the poles in parallel or in series to achieve an increase of the voltage or the current from the cells 4. As shown in FIG. 1, a cover 45 is disposed below the busbars 5. The busbars 5, the flexible electrical connection element 6, and the cover 45 extend in a general or extension direction 7 which is parallel to a surface of the traction battery 2.

The cells 4 are subjected to relative movement, for example, due to mechanical stress or movement during the operation of the vehicle. Further, the busbars 5 expand when a current running through them increases their temperature. In order to avoid such a relative movement damaging the connection between the busbars 5 and the cells 4, the busbars 5 have compensation sections 10, 15 in which the busbar 5 extends sideways away from the extension direction 7. At the compensation section 10, 15, the busbars 5 extend away from the extension direction 7 along a direction 8 that is perpendicular to the extension direction 7. In an embodiment, the busbars 5 are made from flat sheet metal and the compensation sections 10, 15 are formed by bending the sheet metal. The compensation sections 10, 15 elastically deform during relative movement of the cells 4 and a location of contact between the busbars 5 and cells 4 remains force-free, allowing for relative movements without losing electrical contact with the cells 4.

The flexible electrical connection element 6, as shown in FIG. 1, also has a compensation section 10, 16 in which the flexible connection electrical connection element 6 extends sideways away from the extension direction 7. The flexible electrical connection element 6, in an embodiment, is a flexible flat cable (FFC) that has an insulating body and several conductors located in the insulating body. The conductors of the flexible electrical connection element 6 are connected at different points of the electrical connection assembly 1 to cells 4 to monitor the voltage at the different locations.

The busbar 5 and the flexible electrical connection element 6, as shown in FIG. 1, both have a rectangular cross-section with first flat sides 60 which face each other. A second flat side 60 of the busbar 5 faces the cover 45 and a second flat side 60 of the flexible electrical connection element 6 faces away from the traction battery 2.

As shown in FIG. 1, the compensation section 10, 16 of the flexible electrical connection element 6 defines an area 26 in which the compensation section 10, 15 of the busbar 5 is located; the compensation section 10, 15 of the busbar 5 is located within the compensation section 10, 16 of the flexible electrical connection element 6. Both compensation sections 10, 15 and 10, 16 are part of an overall compensation section 10, 17 of the connection assembly 1. At this overall compensation section 10, 17, both compensation sections 10, 15, 16 of the busbar 5 and the flexible electrical connection element 6 extend away in the same direction 8 from the extension direction 7 of the connection assembly 1. The two compensation sections 10, 15, 16 are nested within each other. In another embodiment, the compensation section 10, 16 of the flexible electrical connection element 6 can be located within the compensation section 10, 15 of the busbar 5.

The compensation section 10, 15 of the busbar 5 and the compensation section 10, 16 of the flexible electrical connection element 6 are located next to each other as shown in FIG. 1. Outside the compensation section 10, 15, 16, the busbars 5 and the flexible electrical connection element 6 lie in an abutting manner next to each other and are attached to each other. At the compensation sections 10, 15, 16, a spacing exists between the two. The busbars 5 and the flexible electrical connection element 6 are separated at the compensation sections 10, 15, 16 and are connected to each other outside the compensation section 10, 15, 16. The compensation section 10, 15 of the busbar 5 and the compensation section 10, 16 of the flexible electrical connection element are spaced from each other in the direction 8 perpendicular to a plane of the busbar 5 and perpendicular to the extension direction 7 to allow a relative movement of the two. At a central location, the two compensation sections 10, 15, 16 are spaced at a distance 40 from each other.

In the embodiment shown in FIG. 1, the connection assembly 1 has two overall compensation sections 10, 17; one on each of two busbars 5. Each of the overall compensation sections 10, 17 is disposed outside a gap section 21 at which a gap 20 is disposed between the two busbars 5; each of the overall compensation sections 10, 17 is located between two gap sections 21. At the gap section 21, the flexible electrical connection element 6 bridges the gap 20 and runs through the gap section 21 in a continuous and straight manner. In an embodiment, the connection assembly 1 has at least three separate busbars 5 that are spaced from each other at two gap sections 21 and at least one overall compensation section 10, 17 is located between the two gap sections 21.

Each of the compensation sections 10, 15, 16 of the busbar 5 and the flexible electrical connection element 6, in the embodiment shown in FIG. 1, have at least one 180° curve 31 located between two 90° curves 32. Thus, each of the compensation sections 10, 15, 16 has a U-shape 33 in which a connection section 35 is located between two legs 34. At the compensation sections 10, 15, 16, the busbar 5 and the flexible electrical connection element 6 turn away from the extension direction 7 perpendicular to the flat side 60 of the busbar 5 and the flexible electrical connection element 6. The U-shape can also comprise an omega-shapes or a C-shape.

Figure 2:
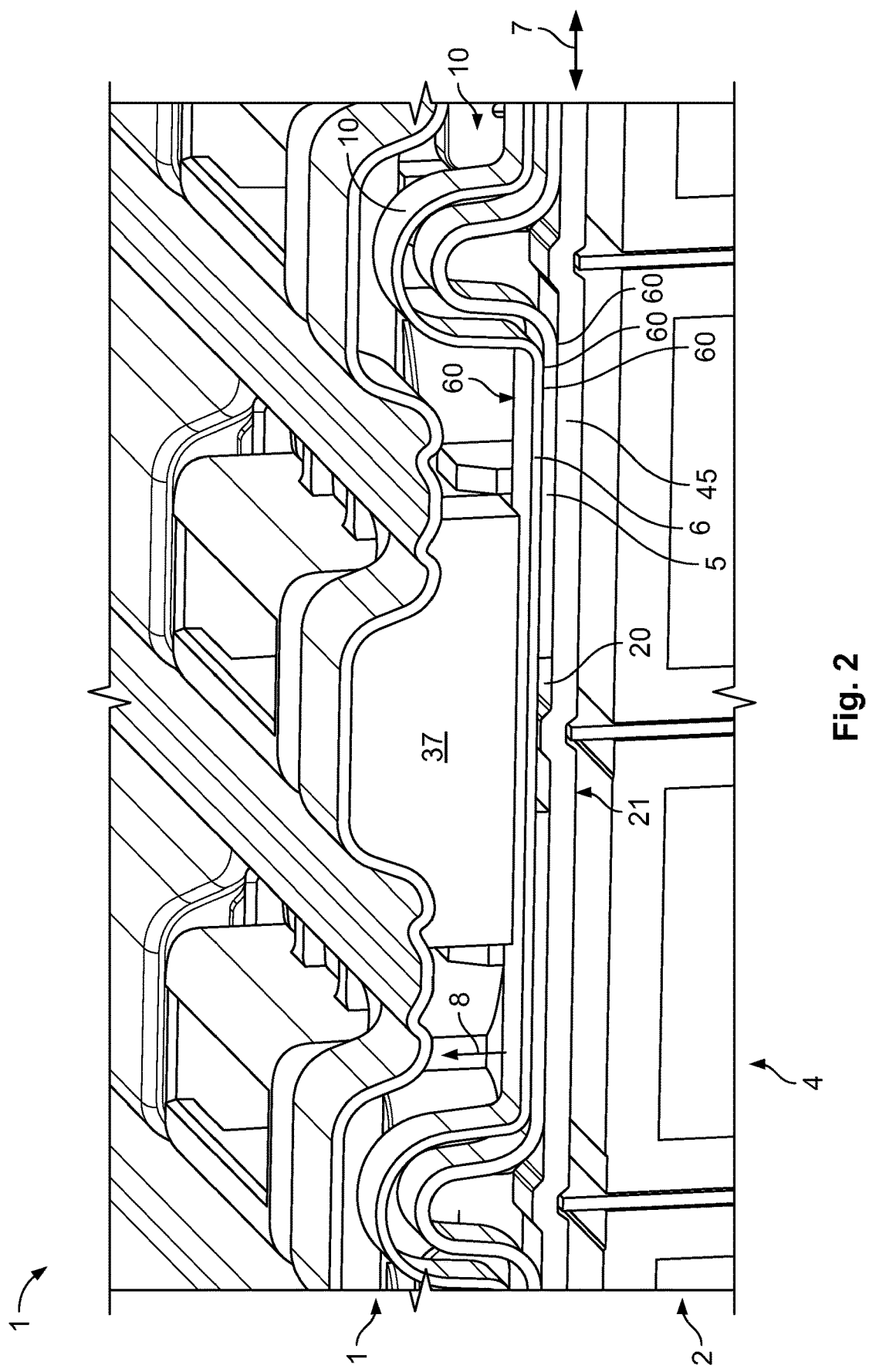
FIG. 2 is a perspective view of the connection assembly of FIG. 1 with a holding member.

As shown in FIG. 2, the connection assembly 1 further comprises a holding member 37 which pushes down the flexible electrical connection element 6 and the busbars 5 in particular at the gap section 21. The holding member 37 helps to fix the connection assembly 1 to the traction battery 2.

Figure 3:
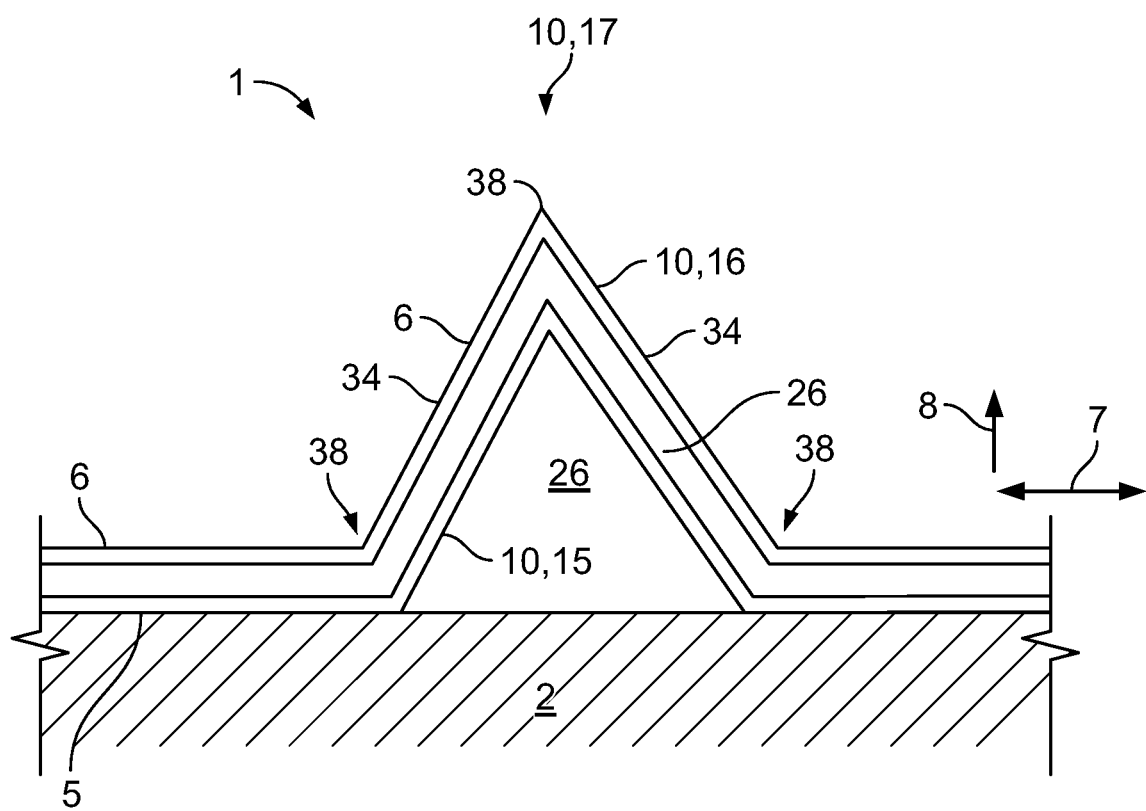
FIG. 3 is a sectional view of a connection assembly according to another embodiment.

A connection assembly 1 according to another embodiment is shown in FIG. 3. In the embodiment shown in FIG. 3, the compensation sections 10, 15, 16 have straight sections instead of the curved versions shown in the embodiment of FIGS. 1 and 2. Each compensation section 10, 15, 16 has two legs 34 that are connected to each other at a 60° angle. These legs 34 are at an angle of 120° to further sections of the busbar 5 or the flexible electrical connection element 6. A compensating movement is thus possible through a hinged movement at the corners 38 of the compensation sections 10, 15, 16. As in the embodiment of FIGS. 1 and 2, the two compensation sections 10, 15, 16 are spaced apart from each other in a direction 8 perpendicular to an extension direction 7 of the connection assembly 1.

What is claimed is:

1. A connection assembly for a traction battery, comprising:

a busbar extending in an extension direction and having a first compensation section in which the busbar extends in a first direction perpendicular with respect to the extension direction; and a flexible electrical connection element that is a piece separate from the busbar is positioned over the busbar and extends along the busbar in the extension direction, the flexible electrical connection element having a second compensation section in which the flexible electrical connection element extends in the first direction perpendicular with respect to the extension direction, the second compensation section being arranged over and spaced apart from the first compensation section in a direction perpendicular to a plane of the busbar such that the first compensation section is positioned within the second compensation section.

2. The connection assembly of claim 1, wherein the first compensation section and the second compensation section are disposed next to each other.

3. The connection assembly of claim 1, wherein an overall compensation section of the connection assembly includes the first compensation section and the second compensation section.

4. The connection assembly of claim 1, wherein the busbar and the flexible electrical connection element are connected to each other outside of the first compensation section and the second compensation section.

5. The connection assembly of claim 1, further comprising at least three busbars spaced apart from each other by a pair of gap sections.

6. The connection assembly of claim 5, wherein the first compensation section of one of the at least three busbars is located between the pair of gap sections.

7. The connection assembly of claim 1, first comprising a pair of busbars spaced apart by a gap.

8. The connection assembly of claim 7, wherein the flexible electrical connection element bridges the gap between the pair of busbars.

9. The connection assembly of claim 1, wherein the first compensation section and/or the second compensation section has at least one curve.

10. The connection assembly of claim 9, wherein the first compensation section and/or the second compensation section has one 180 degree curve and a pair of 90 degree curves.

11. The connection assembly of claim 1, wherein the busbar and the flexible electrical connection element each have a substantially rectangular cross-section and a flat side of the busbar faces a flat side of the flexible electrical connection element.

12. The connection assembly of claim 11, wherein the first compensation section extends perpendicular to the flat side of the busbar.

13. The connection assembly of claim 11, wherein the second compensation section extends perpendicular to the flat side of the flexible electrical connection element.

14. The connection assembly of claim 7, further comprising a holding member configured to push down and/or fix a straight section of the flexible electrical connection element.

15. The connection assembly of claim 14, wherein the holding member is disposed at the gap.

* * * * *